J. C. WELCH.
WHEEL.
APPLICATION FILED MAR. 31, 1919.

1,342,784.

Patented June 8, 1920.
2 SHEETS—SHEET 1.

Inventor
JESSE C. WELCH
By Reynolds & Cook
Attorney

J. C. WELCH.
WHEEL.
APPLICATION FILED MAR. 31, 1919.
1,342,784.
Patented June 8, 1920.
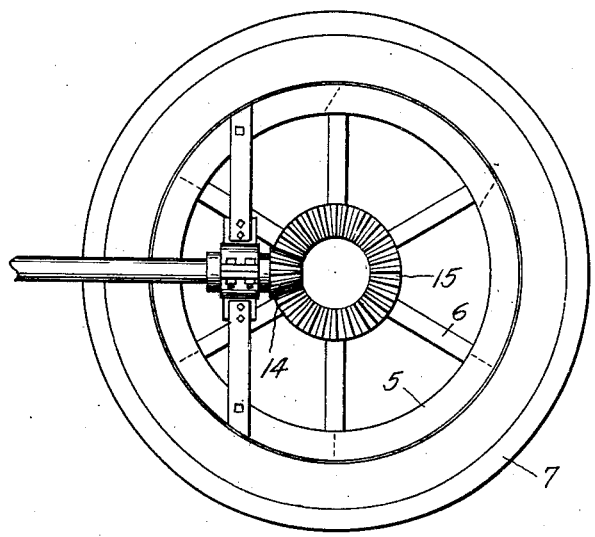
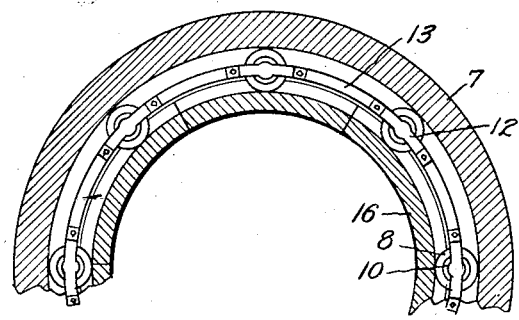
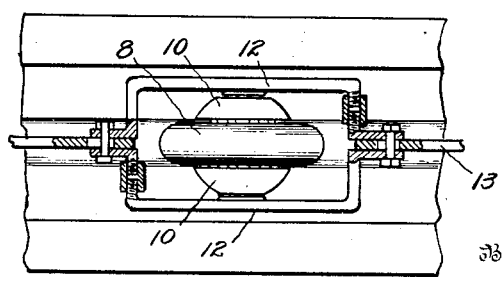
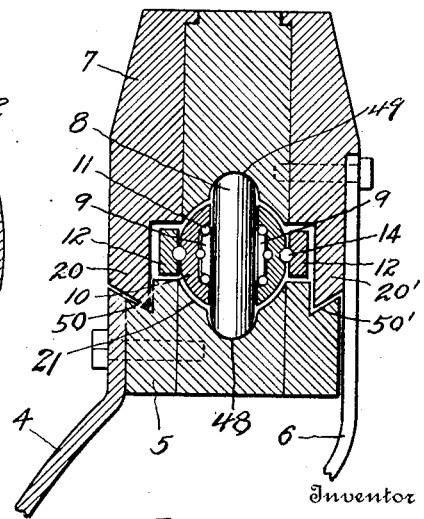
Inventor
JESSE C. WELCH

UNITED STATES PATENT OFFICE.

JESSE C. WELCH, OF TACOMA, WASHINGTON.

WHEEL.

1,342,784.  Specification of Letters Patent.  Patented June 8, 1920.

Application filed March 31, 1919. Serial No. 286,411.

*To all whom it may concern:*

Be it known that I, JESSE C. WELCH, a citizen of the United States, and resident of the city of Tacoma, county of Pierce, and State of Washington, have invented certain new and useful Improvements in Wheels, of which the following is a specification.

This invention relates to new and useful improvements in wheels for motor driven vehicles and the object of this improvement is to provide a wheel that requires neither spokes, hubs, nor an axle, in the form of its construction, and hence the elimination of the initial cost thereof and repairs incident to these parts.

A further object resides in the attainment of greater traction and reduction in the torsional strain on the driving mechanism as the power is applied directly to the rim of the wheel rather than to its center axis.

The invention consists in the arrangement, construction and combination of parts as will be more fully described in the following specification, illustrated in the accompanying drawings, and finally pointed out in the appended claims.

In the drawings,—

Fig. 3 is a side elevation of the wheel showing the alternative application of power thereto.

Fig. 4 is a vertical section of the rim showing the form of bearings as applied thereto.

Fig. 5 is a side elevation of the rim and the bearings as linked together.

Fig. 6 is a plan view of the bearings as applied to the periphery of the wheel.

Figure 1:
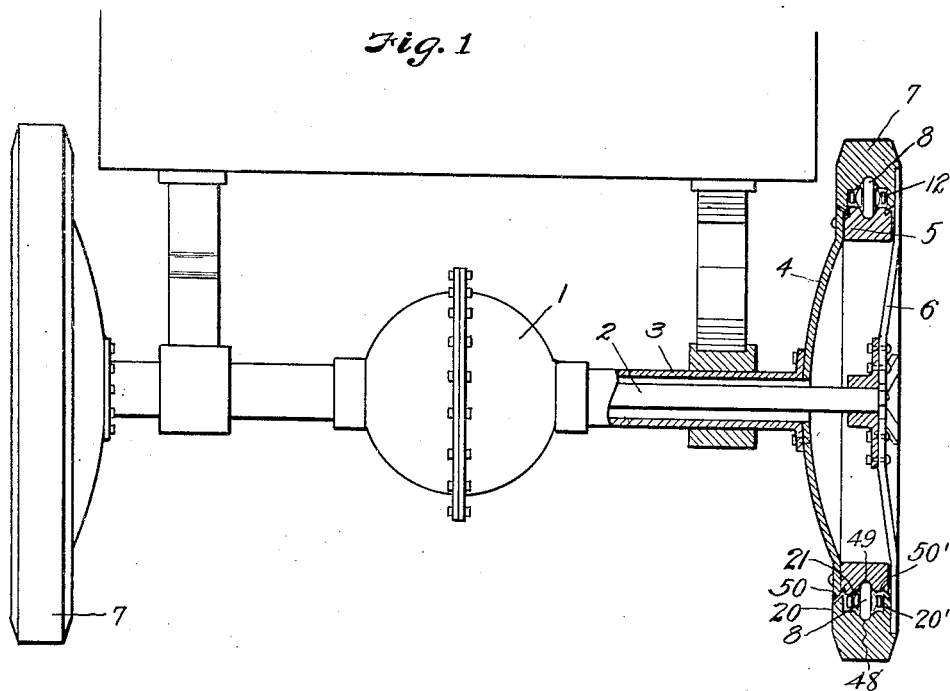
Figure 1 is a vertical section of my improved wheel.

Referring more particularly to the drawings, in which like reference numerals indicate like parts, the numeral 1 represents the differential housing of a motor driven vehicle from whence power is communicated from the engine to the driving shaft 2. As herein shown, this shaft is incased within a housing 3 and this housing has fixedly attached upon its outer ends respectively, a disk or radially extended spokes 4, which connect with a stationary, or internal, ring 5.

The shaft 2 is extended through the housing 3 and has projecting radially from its outer ends a disk or spokes 6, which connect radially with the rotatable rim 7 of the wheel. In this manner, when the shaft 2 is rotated, power is applied directly to the rim 7 of the wheel and not to its center axis, as formerly. Consequently, the torsion upon the driving shaft is reduced very materially and traction of the wheels increased.

The internal ring 5 and internal rim 7 are provided respectively with grooves 48 and 49 which are located centrally within the adjacent peripheries of the two members and wherein anti-friction bearings are located. The internal peripheral edges of the rim 7 are provided with flanges 20, 20', which are adapted to overlap opposite sides of a projecting central portion 21 of the ring 5 and extend within grooves 50, 50' at opposite sides thereof, so that strength and rigidity is given the parts and lateral displacement of both the bearings and the rim is prevented. The bearings herein shown are distinctly new and novel and form the subject of a co-pending application of even date. It is deemed sufficient to give only a short description of their construction and mode of operation, as no claim is made in this application thereto, hence I do not care to be limited to any particular form of bearing as a part of this invention.

As more clearly shown in Fig. 4, the bearing is oval in formation, consisting of a roller 8 having integral hubs 9 provided with a plurality of concavities on their outer periphery. Disposed on the opposite sides of the roller 8 are crescent shaped rollers 10 having similarly shaped concavities adjacent those provided in the periphery of the hubs 9, which form raceways for the balls 11 disposed therein. This bearing is spaced apart in suitably housed units 12 around the outer periphery 5 of the wheel and are connected together by links 13. Ball bearings 14 can be placed in properly designed sockets to reduce friction between the rollers 10 and the housing 12.

Both the rim 7 and the outer periphery 5 of the wheel can be shaped to conform in contour with the bearings, forming a closed compartment for lubricant placed therein.

Figure 2:
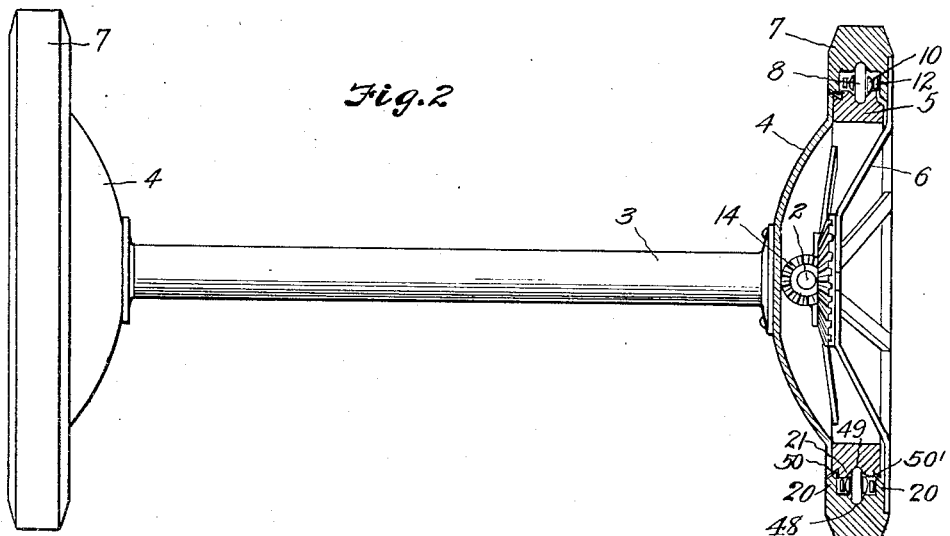
Fig. 2 is a vertical section of the same, showing an alternative means of driving the same.

In Figs. 2 and 3 the shaft 2 is shown mounted transversely the housing 3, being provided with beveled pinion 14 that meshes with the beveled gear 15 provided on the center axis of the wheel. This shaft extends forwardly on the sides of the vehicle and is driven by a jack shaft, (not shown) of the usual form of construction, where chain drive is employed.

For the purpose of providing access to the bearing of the wheel, the periphery 5 of the wheel is formed in segments 16, more clearly shown in Fig. 5, which can be bolted together and removed inwardly very quickly and easily to afford repairs.

It is to be understood that various changes in the details of construction can be resorted to within the scope of the appended claims.

What I claim as new and desire to protect by Letters Patent, is:

1. A motor vehicle wheel of the class described, comprising a stationary internal ring provided with a central, peripheral groove and outwardly facing peripheral edge grooves, a rim rotatably mounted upon the internal ring having an internal, peripheral groove coöperatively registering with the first named groove to return anti-friction members therein and having projecting flanges on the internal periphery extending into the peripheral edge grooves of the ring to retain the rim in functional position upon the ring.

2. A motor vehicle wheel of the class described, comprising a stationary internal ring having an annular extension provided with a central, peripheral groove, a rim inclosing and mounted revolubly about the ring having an internal, peripheral groove coöperatively registering with the groove of the ring to retain anti-friction members therebetween and having edge flanges overlapping the projecting annular extension of the ring to retain the parts in functional position.

Signed at Seattle, Washington, this 21st day of March, 1919.

JESSE C. WELCH.